United States Patent
Yamazaki

(10) Patent No.: US 10,574,839 B2
(45) Date of Patent: Feb. 25, 2020

(54) IMAGE PROCESSING APPARATUS, METHOD AND STORAGE MEDIUM FOR ACQUIRING CHARACTER INFORMATION FROM SCANNED IMAGE

(71) Applicant: CANON KABUSHIKI KAISHA, Tokyo (JP)

(72) Inventor: Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/128,972

(22) Filed: Sep. 12, 2018

(65) Prior Publication Data

US 2019/0089849 A1 Mar. 21, 2019

(30) Foreign Application Priority Data

Sep. 21, 2017 (JP) .................................. 2017-181698

(51) Int. Cl.
*H04N 1/00* (2006.01)
*G06K 9/00* (2006.01)

(52) U.S. Cl.
CPC ..... *H04N 1/00331* (2013.01); *G06K 9/00456* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,503,773 B2 | 8/2013 | Kanatsu et al. | 382/165 |
| 2007/0263930 A1* | 11/2007 | Ito | G06K 9/2063 382/177 |
| 2010/0067023 A1* | 3/2010 | Ito | H04N 1/41 358/1.2 |
| 2016/0005202 A1 | 1/2016 | Yamazaki et al. | G06T 11/60 |

FOREIGN PATENT DOCUMENTS

JP H11-232388 8/1999

* cited by examiner

*Primary Examiner* — Andrew H Lam
(74) *Attorney, Agent, or Firm* — Venable LLP

(57) ABSTRACT

An image processing apparatus including: an analysis unit configured to extract a text area by performing area division processing for a binary image obtained by binarizing the scanned image by a first binarization method; a determination unit configured to determine a binary image used in OCR processing; and a character recognition unit configured to perform the OCR processing by using the binary image determined by the determination unit for the text area extracted by the analysis unit, and the determination unit: in a case where a binary image used in the area division processing is suitable to the OCR processing, determines the binary image as a binary image used in the OCR processing; and in a case where a binary image used in the area division processing is not suitable to the OCR processing, generates a binary image by a second binarization method whose accuracy is higher than that of the first binarization method and determines the generated binary image as a binary image used in the OCR processing.

12 Claims, 15 Drawing Sheets

SCANNED IMAGE

ORDER SHEET

COMPANY NAME    MESSRS.    ISHII SANGYO INC.

PERSON IN CHARGE    MR.    KOICHI ISHII

TOTAL AMOUNT    ¥428,760

FIG.8A

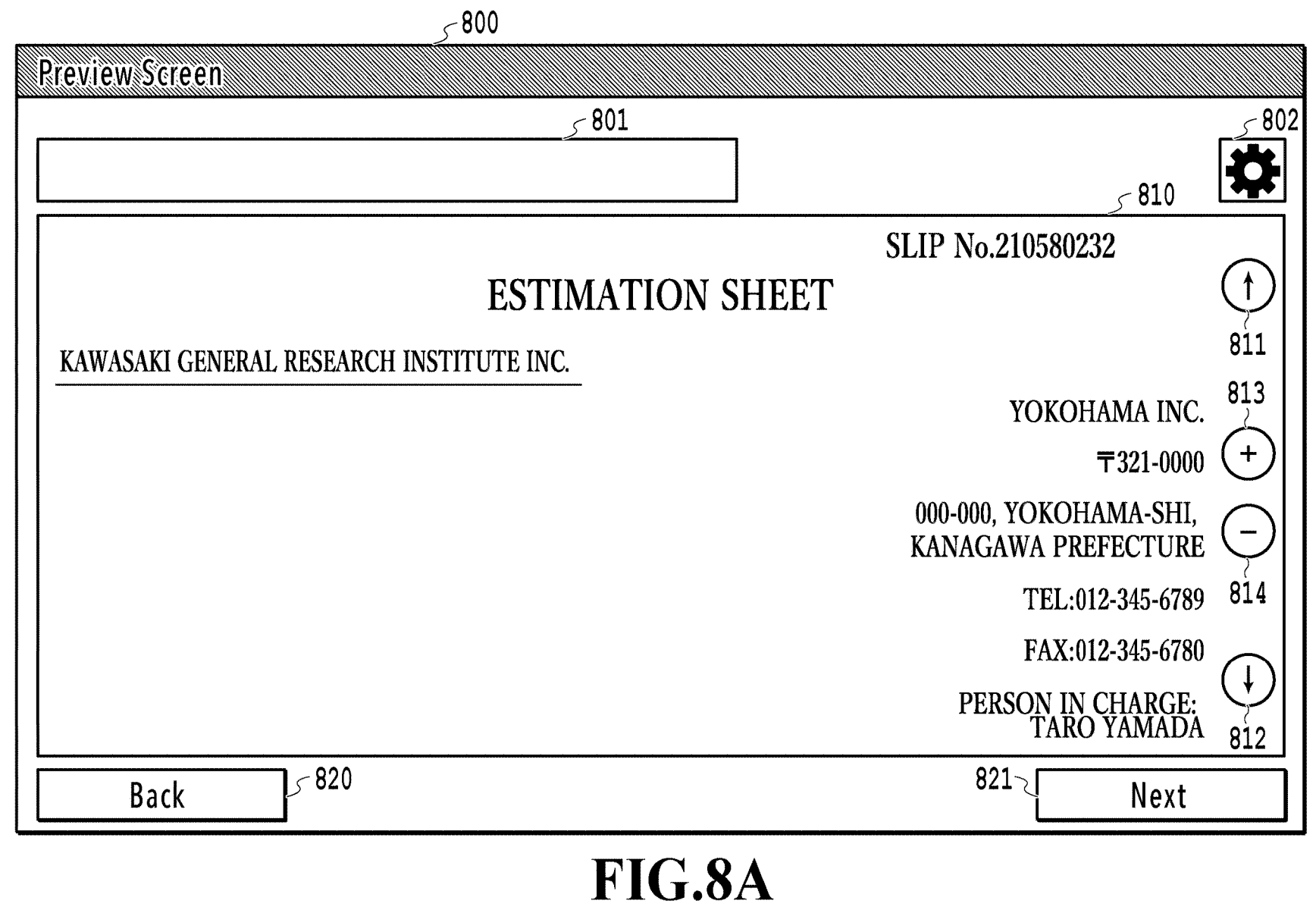

Preview Screen 800
801
802

810 SLIP No.21058023

ESTIMATION SHEET

KAWASAKI GENERAL RESEARCH INSTITUTE INC.

811 ←
813 +
- 814
→ 812

YOKOHAMA INC.
〒321-0000
000-000, YOKOHAMA-SHI, KANAGAWA PREFECTURE
TEL:012-345-6789
FAX:012-345-6780
PERSON IN CHARGE: TARO YAMADA

820 Back
821 Next

IMAGE PROCESSING APPARATUS, METHOD AND STORAGE MEDIUM FOR ACQUIRING CHARACTER INFORMATION FROM SCANNED IMAGE

BACKGROUND OF THE INVENTION

Field of the Invention

The present invention relates to a character recognition technique for acquiring character information from a scanned image.

Description of the Related Art

Conventionally, as a management method of a document, a method of digitizing a paper document by scanning the paper document has been performed widely. Then, there is a technique that performs character recognition processing (OCR processing) for scanned image data at the time of digitization of a document and which uses a recognized character as a file name of a digitized document file. Such a work is normally performed in an apparatus, such as an MFP (Multi Function Peripheral). At this time, first, analysis processing for extracting the position of a character string is performed and a preview display of results thereof is produced on a UI screen, and after this, by using character recognition results obtained by performing OCR processing, file name generation or the like is performed. Then, in order for a user to perform a series of operations without stress, both a quick preview display and highly accurate OCR processing are required.

Here, in order to implement a quick preview display, it is necessary to perform binarization processing in the above-described analysis processing at a high speed and on the other hand, in order to perform OCR processing for file name generation with a high accuracy, a high image quality binary image suitable to OCR processing is necessary. As a technique to obtain a high image quality binary image, for example, there is a method disclosed in Japanese Patent Laid-Open No. H11-232388(1999). In Japanese Patent Laid-Open No. H11-232388(1999), a slice level, which is a threshold value of binarization, is determined based on determination information on a state of a character string and determination information on a state of character recognition.

In the method of Japanese Patent Laid-Open No. H11-232388(1999), one threshold value of binarization is determined for the entire input image, and therefore, for example, in the case where a character area in a color whose luminance is high and a character area in a color whose luminance is low are included in the input image, it is no longer possible to perform binarization appropriately.

SUMMARY OF THE INVENTION

The image processing apparatus according to the present invention is an image processing apparatus that acquires character information from a scanned image, the image processing apparatus including: an analysis unit configured to extract a text area by performing area division processing for a binary image obtained by binarizing the scanned image by a first binarization method; a determination unit configured to determine a binary image used in OCR processing; and a character recognition unit configured to perform the OCR processing by using a binary image determined by the determination unit for the text area extracted by the analysis unit, and the determination unit: in a case where a binary image used in the area division processing is suitable to the OCR processing, determines the binary image as a binary image used in the OCR processing; and in a case where a binary image used in the area division processing is not suitable to the OCR processing, generates a binary image by a second binarization method whose accuracy is higher than that of the first binarization method and determines the generated binary image as a binary image used in the OCR processing.

Further features of the present invention will become apparent from the following description of exemplary embodiments with reference to the attached drawings.

BRIEF DESCRIPTION OF THE DRAWINGS

FIG. 8A and FIG. 8B are diagrams showing an example of Preview screen;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Configuration of Image Processing System

First Embodiment

Figure 1:
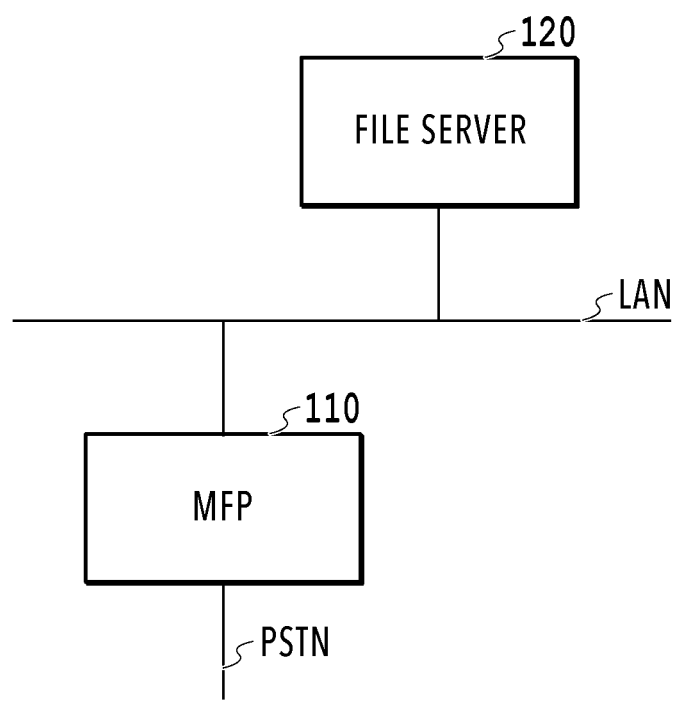
FIG. 1 is a diagram showing a general configuration of an image processing system.

FIG. 1 is a diagram showing a general configuration of an image processing system according to the present embodiment. The image processing system includes an MFP 110 and a file server 120 and the MFP 110 and the file server 120 are connected so as to be capable of communication with each other via a LAN (Local Area Network).

The MFP (Multi Function Printer) 110 is a multi function printer having a plurality of functions, such as a scanner function and a printer function, and is an example of an image processing apparatus. The file server 120 is an example of an external server that saves and manages a digitized document file. The image processing system of the present embodiment has a configuration including the MFP 110 and the file server 120, but the configuration is not limited to this. For example, the MFP 110 may also perform the role of the file server 120. Further, the connection aspect may be one via the Internet, in place of a LAN. Furthermore, the MFP 110 is connected to PSTN (Public Switched Telephone Networks) and is capable of performing facsimile communication of image data with a facsimile device (not shown schematically).

Figure 2:
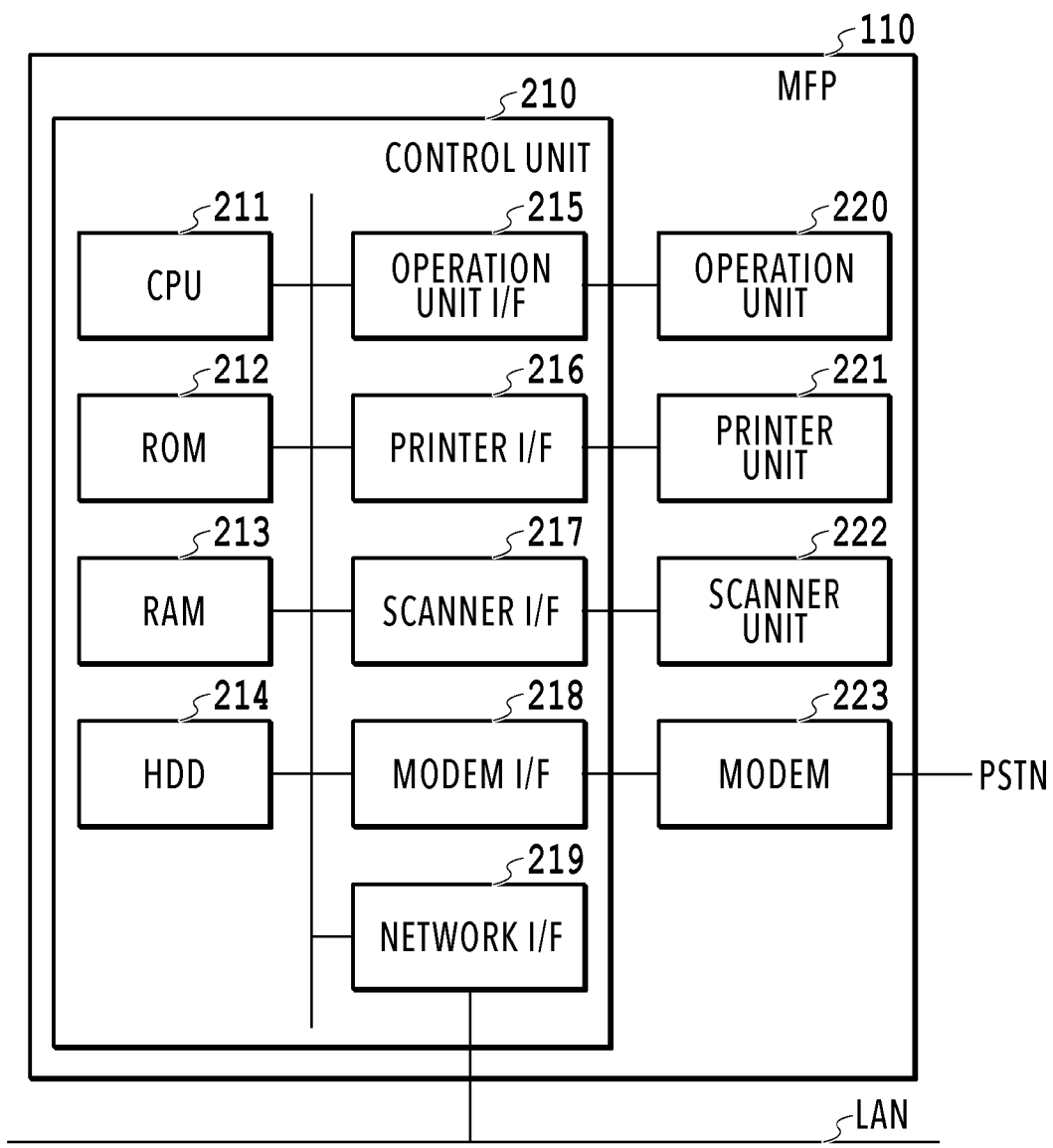
FIG. 2 is a hardware configuration diagram of an MFP.

FIG. 2 is a hardware configuration diagram of the MFP 110. The MFP 110 includes a control unit 210, an operation unit 220, a printer unit 221, a scanner unit 222, and a modem 223. The control unit 210 includes each of units 211 to 219 below and controls the entire operation of the MFP 110. The CPU 211 reads control programs stored in the ROM 212 and performs and controls various functions possessed by the MFP 100, such as read, print, and communication functions. The RAM 213 is used as a temporary storage area, such as a main memory and a work area, of the CPU 211. In the present embodiment, the one CPU 211 performs each piece of processing shown in flowcharts, to be described later, by using one memory (RAM 213 or HDD 214), but this is not limited. For example, it may also be possible to perform each piece of processing by causing a plurality of CPUs or a plurality of RAMs or HDDs to cooperate with one another. The HDD 214 is a large-capacity storage unit configured to store image data and various programs. The operation unit I/F 215 is an interface that connects the operation unit 220 and the control unit 210. The operation unit 220 is provided with a touch panel, a keyboard, and so on, and receives an operation, an input, and instructions by a user. The printer I/F 216 is an interface that connects the printer unit 221 and the control unit 210. Print image data is transferred from the control unit 210 to the printer unit 221 via the printer I/F 216 and printed on a printing medium. The scanner I/F 217 is an interface that connects the scanner unit 222 and the control unit 210. The scanner unit 222 reads a document set on a document table or an ADF (Auto Document Feeder), not shown schematically, and generates image data and inputs the image data to the control unit 210 via the scanner I/F 217. It is possible for the MFP 110 to perform file transmission or mail transmission, in addition to perform printing and outputting (copying) of image data generated by the scanner unit 222 from the printer unit 221. The modem I/F 218 is an interface that connects the modem 223 and the control unit 210. The modem 223 performs facsimile communication of image data with a facsimile device on the PSTN. The network I/F 219 is an interface that connects the control unit 210 (MFP 110) to the LAN. The MFP 110 transmits image data and information to an external device (file server 120 and the like) on the LAN or receives various kinds of information by using the network I/F 219.

Figure 3:
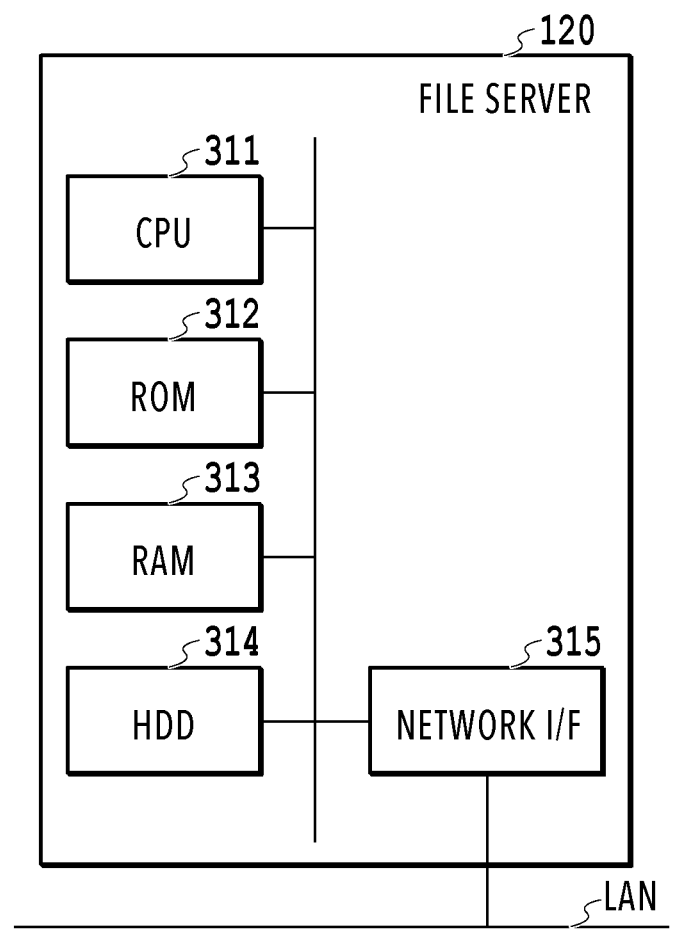
FIG. 3 is a hardware configuration diagram of a file server.

FIG. 3 is a hardware configuration diagram of the file server 120. The file server 120 includes a CPU 311, a ROM 312, a RAM 313, an HDD 314, and a network I/F 315. The CPU 311 controls the operation of the entire file server 120 by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects the file server 120 to a LAN. The file server 120 performs transmission and reception of various kinds of information with another device (MFP 110 and the like) on the LAN by using the network I/F 315.

Software Configuration of MFP

Figure 4:
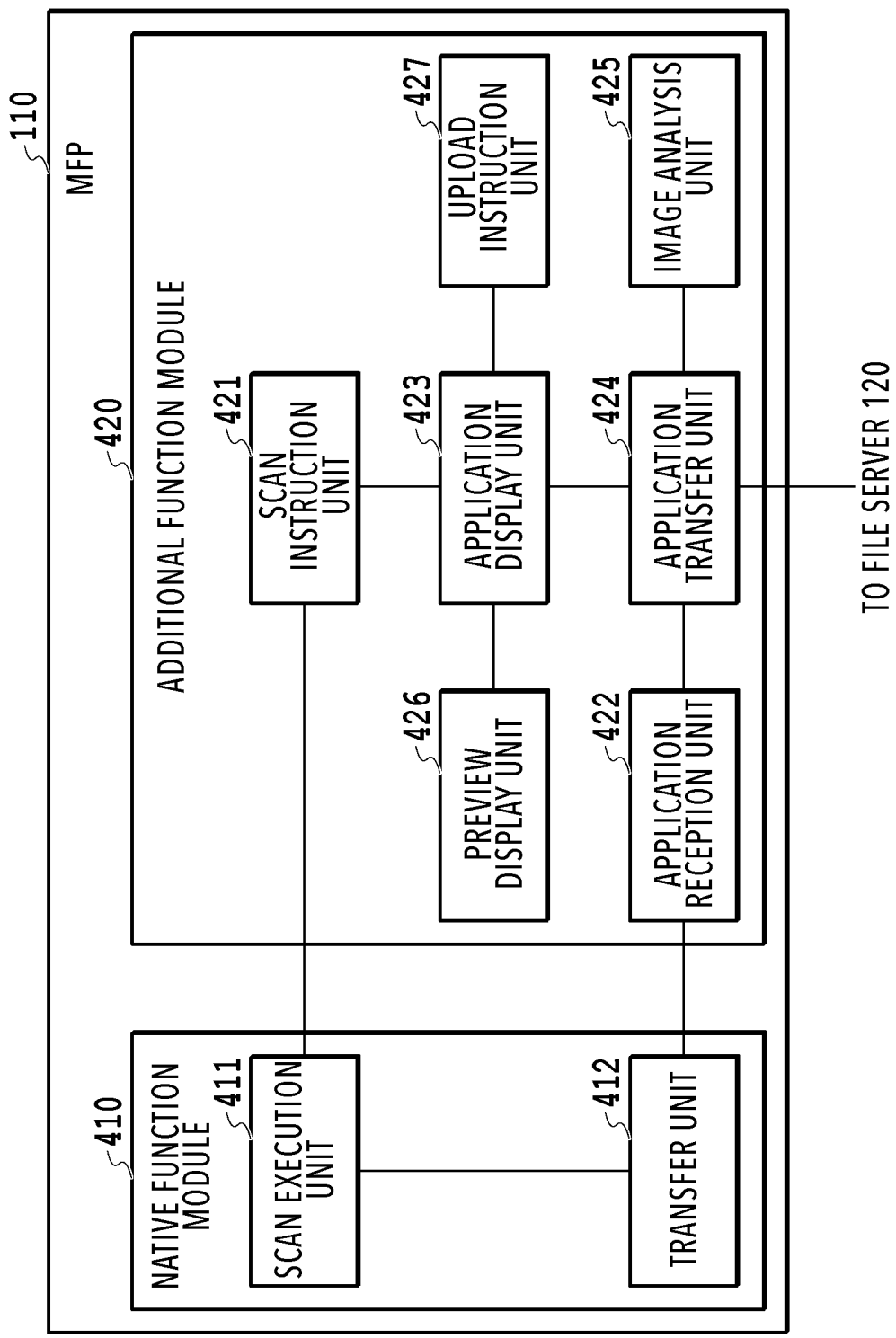
FIG. 4 is a software configuration diagram of the MFP.

FIG. 4 is a software configuration diagram of the MFP 110. The software of the MFP 110 can be roughly divided into two modules: a native function module 410 and an additional function module 420. Each unit included in the native function module 410 is a function module provided to the MFP 110 as standard modules. In contrast to this, each unit included in the additional function module 420 is a function module provided to the MFP 110 additionally and is, for example, a function module implemented by installation of an application. The additional function module 420 in the present embodiment is an application based on Java (registered trademark) and it is possible to easily implement addition of a function to the MFP 110. Another application, not shown schematically, may be installed in the MFP 110. In the following, each unit making up both the native function module 410 and the additional function module 420 is explained.

An application display unit 423 performs display control to display a user interface screen (UI screen) for receiving various operations by a user on the touch panel of the operation unit 220. Details of the UI screen that is displayed will be described later. A scan instruction unit 421 transmits a scan request including information on the scan setting and transfer setting to a scan execution unit 411 and causes the scan execution unit 411 to perform scan processing in accordance with user instructions input via the UI screen. This scan request also includes a request ID for identifying whether image data received by an application reception unit 422, to be described later, is image data corresponding to the scan request.

Upon receipt of the scan request from the scan instruction unit 421, the scan execution unit 411 controls the scanner unit 222 via the scanner I/F 217 and performs scanner processing. Due to this, a document is read and image data is generated. The image data generated by a scan (hereinafter, called "scanned image data") is delivered to a transfer unit 412 together with information on the transfer setting specifying a transfer destination thereof. The transfer unit 412 transfers the scanned image data received from the scan execution unit 411 in accordance with the transfer setting. As the transfer destination of the scanned image data, it is possible to set the file server 120, a PC (not shown schematically) on the LAN, and so on. However, in the present embodiment, it is assumed that all of the scanned image data generated by the scan execution unit 411 is set so as to be temporarily transferred to the additional function module 420. The transfer unit 412 has an FTP (File Transfer Protocol) client function and transfers scanned image data by the FTP to the application reception unit 422 having an FTP server function.

The application reception unit 422 receives scanned image data internally transferred from the transfer unit 412 and delivers the scanned image data to an application transfer unit 424. The application transfer unit 424 delivers the received scanned image data to an image analysis unit 425. The image analysis unit 425 performs image analysis processing, such as specification of a text area and character recognition, for the received scanned image data. Then, the scanned image data and the analysis results thereof are delivered to a preview display unit 426 via the application transfer unit 424. The preview display unit 426 generates a UI screen for a user to perform file name setting based on the scanned image data and the analysis results thereof and performs display control, such as displaying the UI screen on a liquid crystal panel of the operation unit 220.

An upload instruction unit 427 generates a UI screen for a user to perform folder path setting and displays the UI screen on the touch panel of the operation unit 220. The application transfer unit 424 transfers (transmits) scanned image data to the file server 120. Upon completion of the transfer, the application transfer unit 424 notifies the application display unit 423 that the transfer is completed. Upon receipt of the notification from the application transfer unit 424, the application display unit 423 updates the display contents. Further, the application transfer unit 424 has an SMB (Server Message Block) client function. Due to this, the application transfer unit 424 performs a file operation and a folder operation by using the SMB for the file server 120 having an SMB server function. The protocol that is used is not limited to the SMB, and WebDAV, FTP, SMTP, and so on may be used. Further, it is also possible to use a protocol whose purpose is other than file transmission, such as SOAP and REST.

Figure 5:
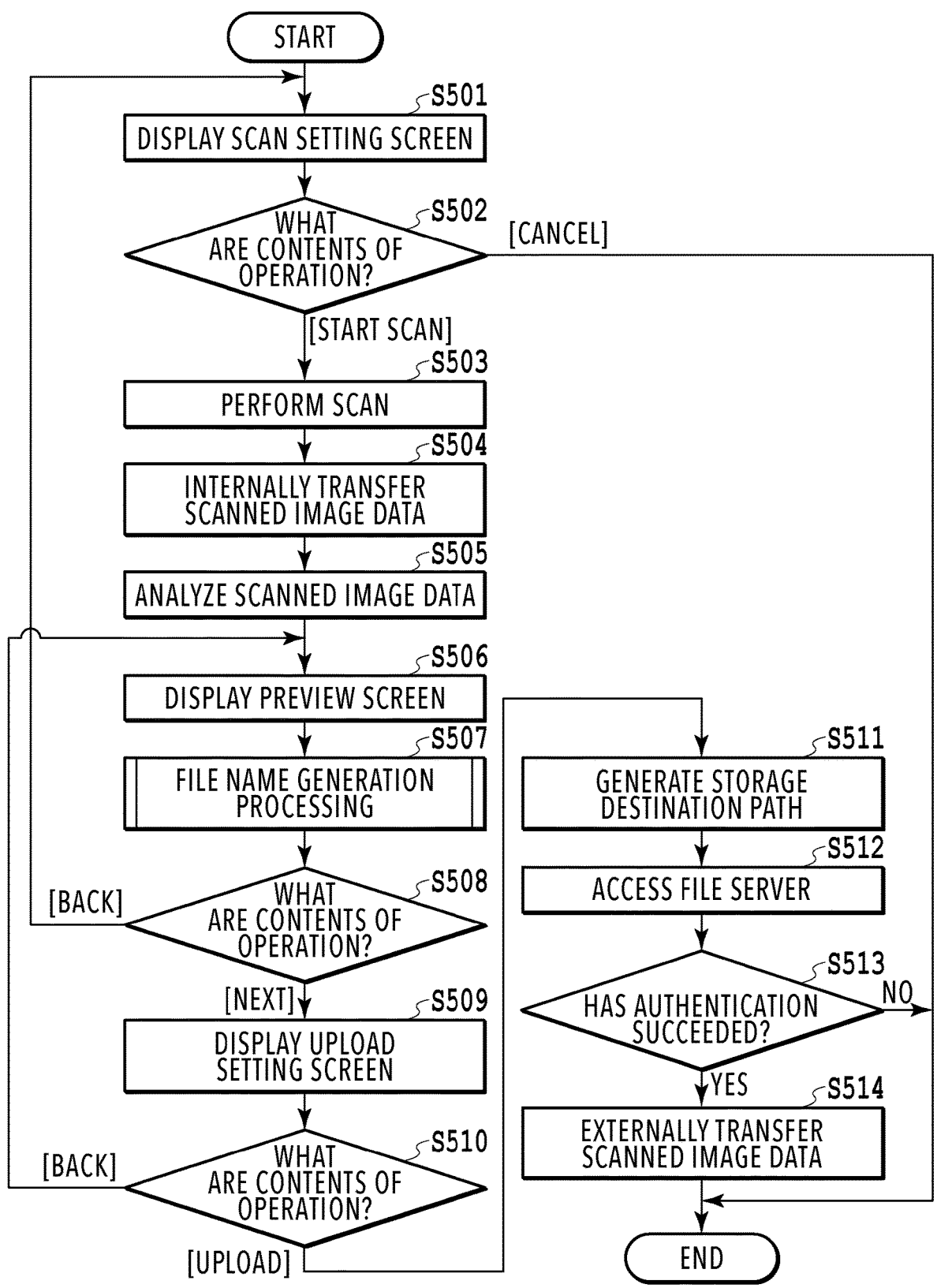
FIG. 5 is a flowchart showing a flow of operation control from generation of a scanned image until upload.

Following the above, the operation control at the time of the MFP 110 generating a scanned image from a document and uploading the scanned image to the file server 120 is explained. FIG. 5 is a flowchart showing a flow of control from generation of a scanned image until upload thereof. The series of processing is implemented by the CPU 211 executing a control program stored in the HDD 214 in the control unit 210. In the following, detailed explanation is given.

Figure 6:
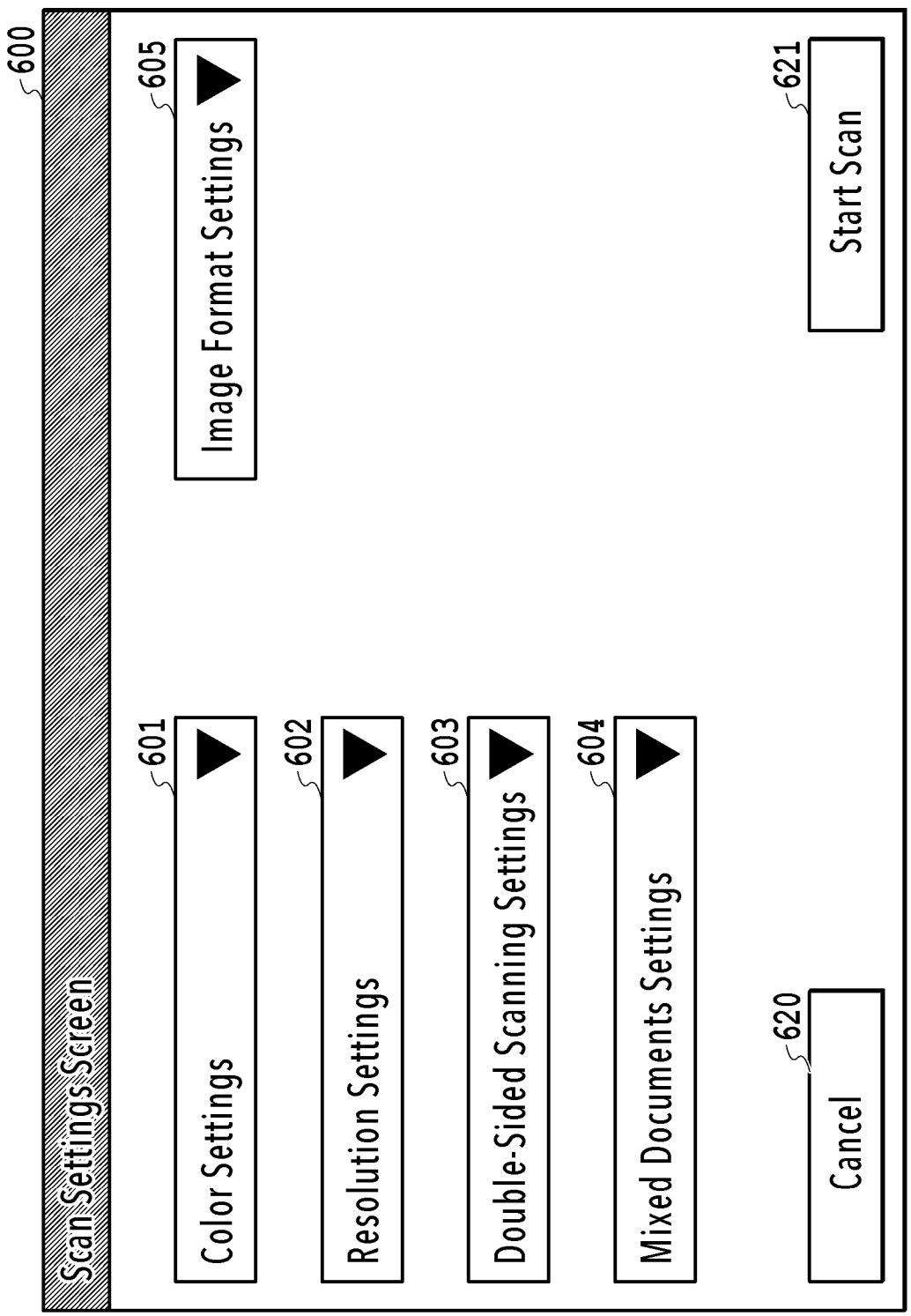
FIG. 6 is a diagram showing an example of Scan setting screen.

At step S501, by the application display unit 423, a UI screen for performing various kinds of setting for scan processing (hereinafter, called a "scan setting screen") is displayed on the touch panel of the operation unit 220. FIG. 6 is a diagram showing an example of a scan setting screen. On Scan setting screen 600, five setting buttons 601 to 605 exist. The "Color Settings" button 601 is a button for setting color or monochrome at the time of scanning a document. The "Resolution Settings" button 602 is a button for setting a resolution at the time of scanning a document. The "Double-Sided Scanning Setting" button 603 is a setting button used in the case where it is desired to scan both sides of a document. The "Mixed documents settings" button 604 is a setting button used in the case where it is desired to scan documents different in size at a time. The "Image Format settings" button 605 is a setting button used at the time of specifying a save format of scanned image data. At the time of setting using these setting buttons 601 to 605, candidates (alternatives) that can be set in a range supported in the MFP 110 are displayed and a user selects a desired one from the displayed candidates. The above-described setting buttons are an example and all of the setting items do not need to exist or another setting item other than those may exist. Via Scan setting screen 600 such as this, a user performs detailed setting for scan processing. A "Cancel" button 620 is a button used in the case where the scan setting is aborted. A "Start scan" button 621 is a button for giving instructions to start scan processing for a document set on a document table and the like.

At step 502, by the application display unit 423, processing is branched according to contents of the button operation by a user. In the case where pressing down of the "Start scan" button 621 is detected, the contents that are set by each of the setting buttons 601 to 605 and the reception of execution start of scan processing are reported to the scan instruction unit 421 by the application display unit 423. On the other hand, in the case where pressing down of the "Cancel" button 620 is detected, this processing is terminated.

At step 503, in response to instructions from the scan instruction unit 421, scan processing is performed by the scan execution unit 411. The scanned image data obtained by the scan processing is internally transferred to the application reception unit 422 by the FTP through the transfer unit 412 and is further sent to the image analysis unit 425 via the application transfer unit 424.

Figures 7A, 7B:
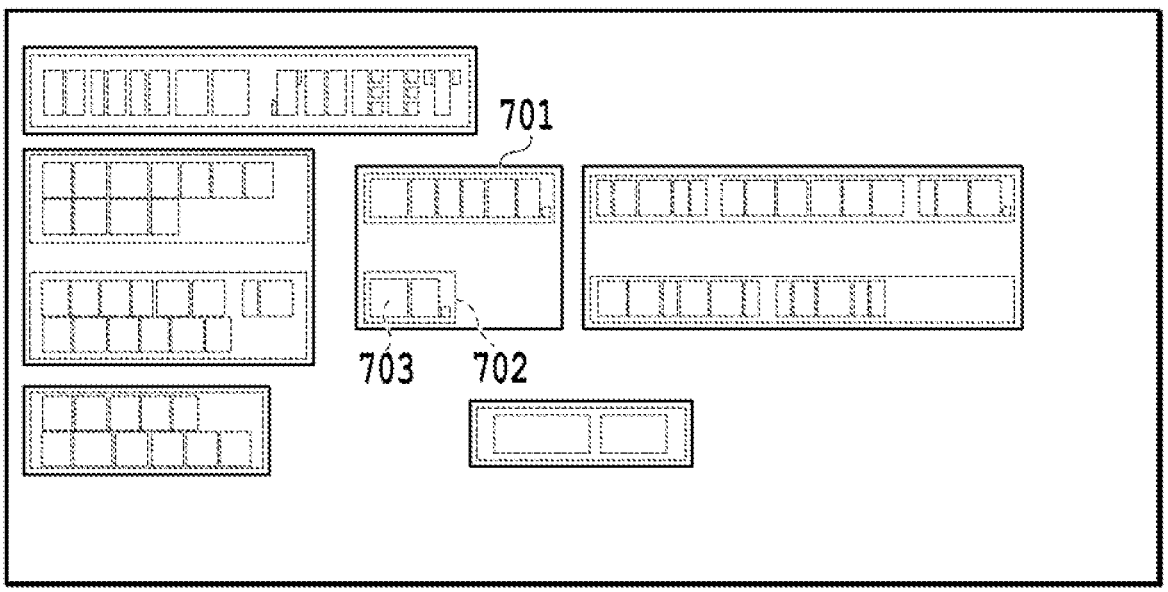
FIG. 7A and FIG. 7B are diagrams showing an example of results of area division processing.

At step 505, in the image analysis unit 425, analysis processing of scanned image data is performed. Specifically, first, the state of the scanned image data is corrected to a state where analysis processing can be performed more easily by performing binarization of the image signal, correcting the inclination of the document shifted at the time of scan, rotating the document in the direction in which the document becomes upright, and so on, for the scanned image data. In the binarization here, priority is given to processing speed over accuracy. That is, the accuracy only needs to be at the level capable of performing area division processing that is performed later and for example, by a method, such as Otsu's method that uses a single threshold value for the entire image, binarization processing is performed at a high speed. Then, processing (area division processing) to specify the area of the text attribute (text area) existing within the mage binarized into white and black is performed. Specifically, first, contour line tracking is performed for the white and block binary image and a cluster of pixels surrounded by a black pixel contour is extracted. Then, for a cluster of black pixels whose area is larger than a predetermined area, the contour line tracking is performed also for the white pixels located inside thereof and a cluster of white pixels is extracted, and further, a cluster of black pixels is extracted recursively from the inside of the cluster of white pixels whose area is larger than or equal to a predetermined area. The clusters of black pixels thus obtained are classified according to size and shape and classified into areas having different attributes. For example, a cluster whose aspect ratio is close to 1 and whose size is within a predetermined range is taken to be a cluster of pixels corresponding to a character. Further, a portion in which characters adjacent to one another can be grouped in alignment is taken to be a character area (Text). A flat cluster of pixels is taken to be a line area (LINE). A range occupied by a cluster of black pixels including in alignment a rectangular cluster of white pixels whose size is larger than or equal to a predetermined size is taken to be a table area (TABLE). An area in which clusters of pixels indefinite in shape are scattered is taken to be a photo area (PHOTO). Then, an arbitrarily-shaped cluster of pixels other than those described above is taken to be a picture area (PICTURE). From those divided into areas for each attribute of an object, a text area is specified. FIG. 7A and FIG. 7B are diagrams showing an example of results of the area division processing. FIG. 7A shows an analysis-target scanned image. In the scanned image in FIG. 7A, in almost all the character strings, such as "Company name", the color component of pixels making up the foreground portion (character) is black, and the color component of pixels making up the background portion is white. However, in the character string "ORDER SHEET", the color component of pixels making up the foreground portion is gray and the color component of pixels making up the background portion is white. Further, in the character string "¥428, 760", the color component of pixels making up the foreground is black and the color component of pixels making up the background portion is pale gray. FIG. 7B shows a text area obtained by performing binarization processing for the scanned image in FIG. 7A and then area division processing. In FIG. 7B, a rectangle 701 indicated by a solid line indicates a block area (Text-block area) obtained by integrating a plurality of adjacent character string rows into one area. A rectangle 702 indicated by a broken line indicates a row area (Text-line area) obtained by dividing the block area 701 in units of rows. Further, a rectangle 703 indicated by a dotted-line indicates a character frame (Character bounding box) obtained by cutting out a circumscribing rectangle of each character from the row area 702. In order to extract the row area 702 from each block area 701, first, it is necessary to determine whether the character string within the block area 701 is written from top to bottom or from left to right (determination of composition direction). Projection histograms are generated for the block area 701 in two directions, that is, in the vertical direction and in the horizontal direction, and in the case where a regular valley appears in the vertical direction, it is determined that the character string is written from top to bottom and in the case where the regular valley appears in the horizontal direction, it is determined that the character string is written from left to right. In the example in FIG. 7A and FIG. 7B, it is determined that all the block areas 701 are written from left to right. Then, by generating the projection histogram again along the determined composition direction and finding the coordinates of the top-left corner, which is the start point, and the bottom-right corner, which is the endpoint, for each of the character frame groups divided at the valley portion, the row area 702 is obtained. Here, in the case of the scanned image in FIG. 7A, when the binarization processing is performed for the image corresponding to the character string "ORDER SHEET" whose color component is gray, a narrow portion of a binarized character image may be blurred, thereby the binarized character image is partitioned to a plurality of clusters of black pixels. For example, if upper and lower portions of a binarized character image "O" are blurred, the character image is partitioned to two clusters of black pixels, thereby two circumscribing rectangles corresponding to the clusters of black pixels are obtained in FIG. 7B. Further, in the case of the scanned image in FIG. 7A, the difference in density between the foreground portion and the background portion in the character string, such as "ORDER SHEET" and "¥428,760, and the difference in density between the foreground portion and the background portion in the other character strings, such as "Company name", are different. In the case where there is a variation in difference in density as described above, the possibility that a circumscribing rectangle that is incorrect as a circumscribing rectangle of a character is included becomes strong because the on-pixel of the foreground portion is lost (blurring of character), the area in which the on-pixel exists extends (collapse of character), and so on, in the results of the binarization processing. Consequently, in the present embodiment, in file name generation processing (step 507 and FIGS. 10-11) in the subsequent stage, the state of the binary image is determined and the OCR processing is performed after performing binarization processing with a high accuracy as needed. Information on the row area 702 (hereinafter, called "row area information") specified by the analysis processing at the step 505 is delivered to the application transfer unit 424 as image analysis data. In the row area information, information on the block area to which each row area belongs and the character frame is also included. It is supposed that the image analysis data has the format, for example, such as CSV and XML, but another format may be accepted. Further, it may also be possible to deliver the information at predetermined timing after temporarily storing the information in the HDD 214. Explanation is returned to the flow in FIG. 5.

Figure 8B:
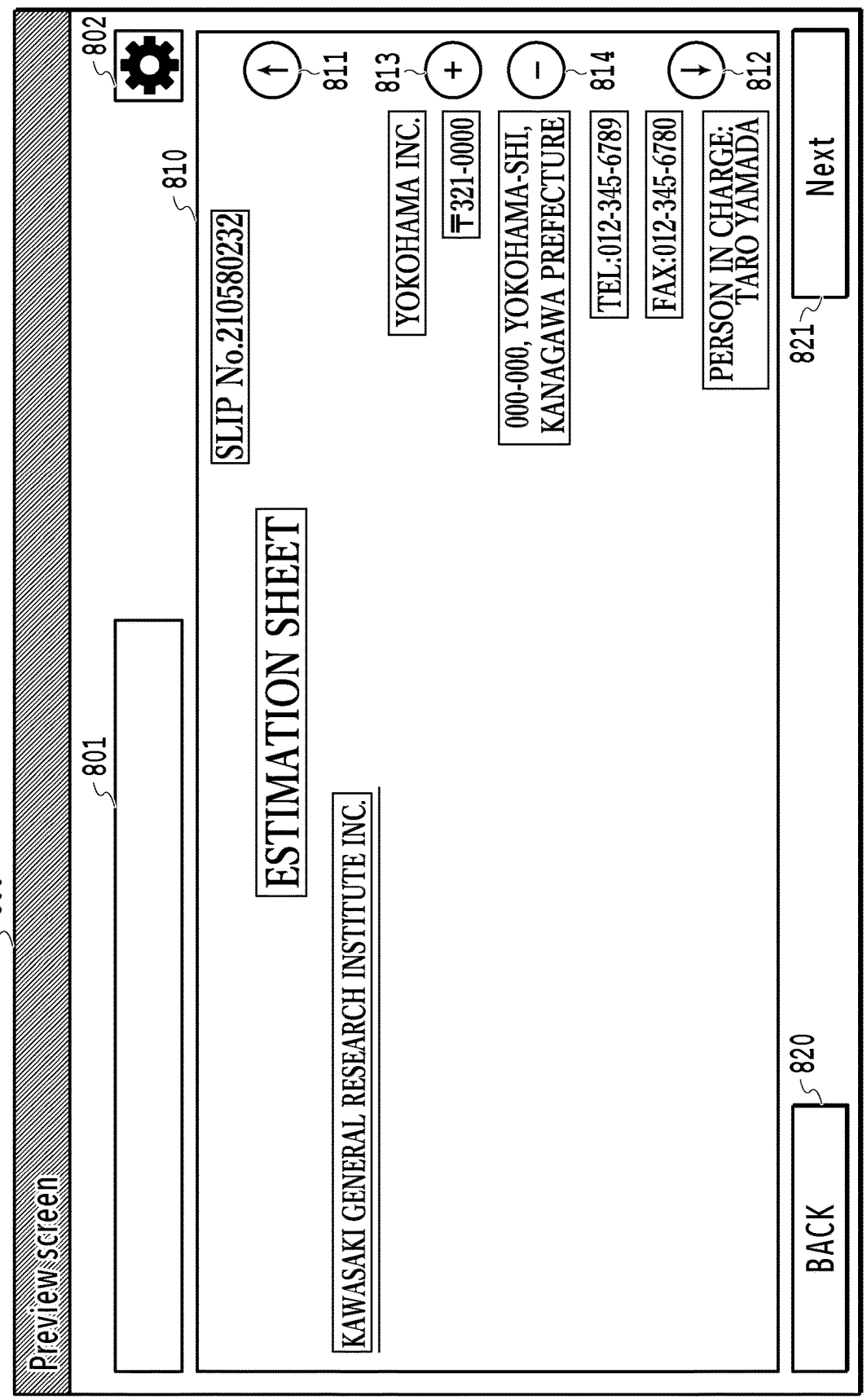

At step 506, by the preview display unit 426, the preview display of the scanned image read at step 503 is produced on the touch panel of the operation unit 220. The screen data for preview display is generated and provided by the application display unit 423. It is possible for a user to set the file name of the scanned image data via a UI screen (hereinafter, called "preview screen") on which the preview display of the scanned image is produced. FIG. 8A is a diagram showing an example of a preview screen. On Preview screen 800, within a preview area 810 located in the middle on the screen, the read scanned image is displayed. Then, within the preview area 810, a plurality of buttons 811 to 814 for changing the display state is also displayed, together with the scanned image. The buttons 811 and 812 appear in the case where it is not possible to display the entire scanned image, buttons for scrolling the display area in the vertical direction. The touch panel included in the MFP 110 is not so large normally. Consequently, for example, in the case where the scanned image is obtained by reading a document of A4 portrait, which is written from left to right, the initial setting is performed so that the scanned image is reduced and displayed so that the top end of the scanned image is aligned with the top end of the preview area 810 and the entire width of the scanned image in the direction of width (in the direction of short side) is just included within the preview area 810. That is, in the initial setting, the lower portion of the scanned image of A4 portrait is not displayed within the preview area 810. In such a case, by pressing down the "↓" button 812, the display area scrolls downward, and therefore, it is possible to display the lower portion. Further, in the case where the scanned image is a document of A4 landscape or a document of A3, it is sufficient to provide buttons to scroll the display area in the horizontal direction. The buttons 813 and 814 are buttons for enlarging or reducing the display area and pressing down the "+" button 813 causes the display area to zoom in and pressing down "−" button 814 causes the display area to zoom out. It may also be possible to implement the operations by these buttons by the operation of a finger of a user, such as swipe, pinch out, and pinch in, on the preview screen. Further, in the preview area 810, the row area specified by the image analysis processing at step 505 is displayed in an aspect in which a user can identify based on the above-described row area information. FIG. 8B is a diagram showing a state where each row area is displayed by a surrounding frame so that the row area can be identified on Preview screen 800 in FIG. 8A. By a user selecting (for example, touching by a finger) an arbitrary row area of the row areas displayed in the preview area 810, the character string included therein is displayed in the file name input box 801, that is, the character string is automatically input and forms a part of the character string making up the file name. It may also be possible to implement the operations by these buttons by the operation of a finger of a user, such as swipe, pinch-out, and pinch-in, on the preview screen. A "Back" button 820 is a button that is used in the case where the preview display is aborted. A "Next" button 821 is a button for the screen to move to a screen on which an upload destination of read scanned image data is set. The various kinds of button described above, the display of each row area, and the aspect of selection are merely exemplary and the example is not limited to this. For example, in the case where a plurality of row areas exists in the block area, it may also be possible to produce a display within the preview screen in units of block areas in place of row areas under a predetermined condition. As such a case, a case is considered where a business form including a table describing character strings in a plurality of rows within one cell. In this case, it is sufficient to determine whether a plurality of character string rows is described within one cell by making use of the results of the attribute determination of the area division processing. Further, there may be a button for modifying or changing the character string displayed in the file name input box 801 or a button for settling the file name.

At step 507, by the preview display unit 426, generation of a file name for the read scanned image is performed. Details of this file name generation processing will be described later. In the case where a desired file name is generated and a user presses down the "Next" button 821, the processing advances to step 508.

At step 508, by preview display unit 426, as in the case with step 502, the processing is branched according to the contents of the button operation by a user. In the case where pressing down of the "Next" button 821 is detected, information on the file name (character string set as file name) being displayed in the file name input box 801 is sent to the upload instruction unit 427 and the processing advances to step 509. In the case where pressing down of the "Back" button 820 is detected, the processing returns to step 501 (display of scan setting screen).

Figure 9:
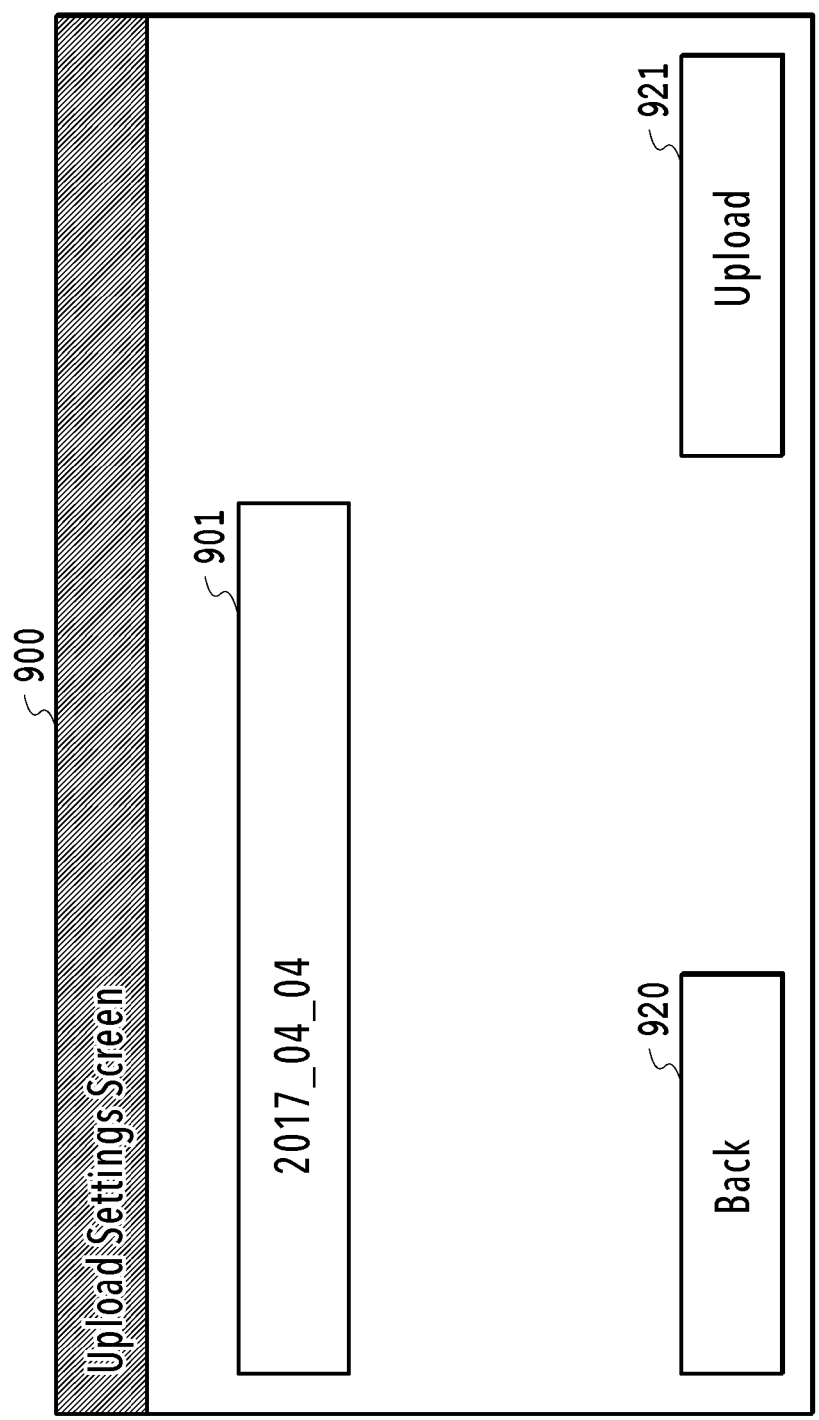
FIG. 9 is a diagram showing an example of Upload setting screen.

At step 509, by the upload instruction unit 427, a UI screen (hereinafter, called "upload setting screen") for setting the transfer destination of scanned image data is displayed on the touch panel of the operation unit 220. A user performs detailed setting relating to the upload to the file server 120 via this upload setting screen. FIG. 9 is a diagram showing an example of an upload setting screen. A user inputs a name (path name) of a folder path at the time of externally transferring scanned image data to the file server 120 to a "folder path" input box 901. In the example in FIG. 9, "2017_04_04" is input as a path name. As an input method, for example, there is a method in which a sub window (not shown schematically) of a keyboard screen is displayed in accordance with the tap operation to the folder path input box 901 and a user is caused to input a path name via the keyboard screen. Alternatively, it may also be possible to enable a user to select and set a path name from an address book stored within the HDD 214. A "Back" button 920 is a button that is used in the case where detailed setting relating to upload is aborted. An "Upload" button 921 is a button for giving instructions to upload the scanned image data to the folder path set in the "folder path" input box 901.

At step 510, by the upload instruction unit 427, the processing is branched according to the contents of the button operation by a user, as in the case with step 508. In the case where pressing down of the "Upload" button 921 is detected, the processing advances to step 511. At this time, each piece of information on the path name that is input in the folder path input box 901, the file name generated at step 507, and the file server setting is delivered to the application transfer unit 424. Here, the file server setting is information necessary for storing the scanned image data in the file server 120 and specifically, includes information, such as the host name, the start point of the folder path, the user name and password for login, and so on. On the other hand, in the case where pressing down of the "Back" button 920 is detected, the processing returns to step 506 (display of preview screen).

At step 511, by the application transfer unit 424, a storage destination path of the scanned image data is generated based on the information received from the upload instruction unit 427. Specifically, the storage destination path is generated by adding a folder path to the file server setting (the host name of the file server 120, the start point of the folder path). Due to this, for example, a storage destination path, such as "¥¥server01¥Share¥2017_04_04", is generated. Then, at step 512, by the application transfer unit 424, access to the file server 120 is performed. At this time, the user name and the password included in the file server setting are transmitted to the file server 120. In the file server 120 having received the user name and the password, authentication processing is performed.

At step 513, by the application transfer unit 424, the processing is branched in accordance with the authentication results of the file server 120. That is, in the case of receiving a notification indicating that the authentication has succeeded from the file server 120, the processing advances to step 514. On the other hand, in the case of receiving a notification indicating that the authentication has failed, this processing is terminated.

At step 514, by the application transfer unit 424, the scanned image data is externally transferred to the folder indicated by the storage destination path generated at step 511 and is stored within the file server 120.

The above is the contents of the operation control from generation of a scanned image until upload thereof according to the present embodiment. In the present embodiment, it is supposed that each piece of processing at step 505 and step 506 is performed for image data corresponding to one page, which is generated by a scan. For example, it may also be possible to provide a button for performing an image analysis of the next page within Preview screen 800 and to make it possible to set the character string making up the file name from the block area of the next and subsequent pages by producing the preview display of the next page, which is obtained by the analysis.

Generation of File Name

Figure 10:
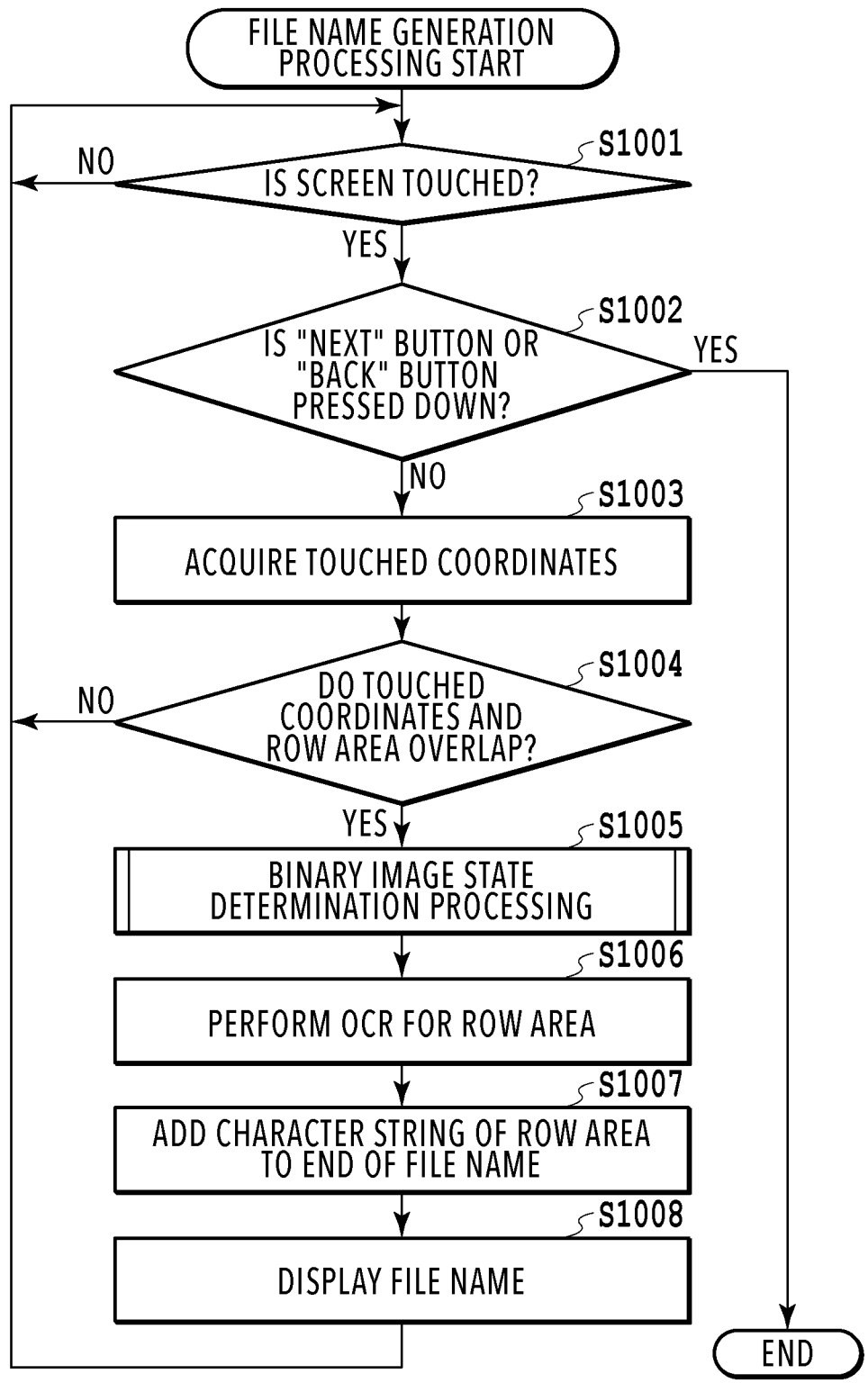
FIG. 10 is a flowchart showing details of file name generation processing according to a first embodiment.

FIG. 10 is a flowchart showing details of the file name generation processing (step 507) in the preview display unit 426. In the following, explanation is given along the flow in FIG. 10.

At step 1001, whether or not there is a touch operation by a user to Preview screen 800 displayed on the touch panel is monitored. In the case where the touch operation is detected, the processing advances to step 1002. At step 1002 that follows, the processing is branched according to the contents of the touch operation. In the case where the contents of the touch operation are pressing down of the "Next" button 821 or the "Back" button 820, this processing is terminated. In the case where the contents of the touch operation are not pressing down of the "Next" button 821 or the "Back" button 820, the processing advances to step 1003.

At step 1003, position coordinates (x, y) on the touch panel to which the touch operation has been performed are acquired. At step 1004 that follows, whether the position coordinates at which the touch operation has been performed overlap one of the row areas is determined. For example, the determination is performed by determining whether the position coordinates at which the touch operation has been performed are included inside each row area displayed in the preview area 810 (inside the rectangle specified by position coordinates indicating the four corners of the row area). In the case where the position coordinates at which the touch operation has been performed overlap one of the row areas, the processing advances to step 1005. On the other hand, in the case where the position coordinates at which the touch operation has been performed do not overlap any row area, the processing returns to step 1001.

Figure 11:
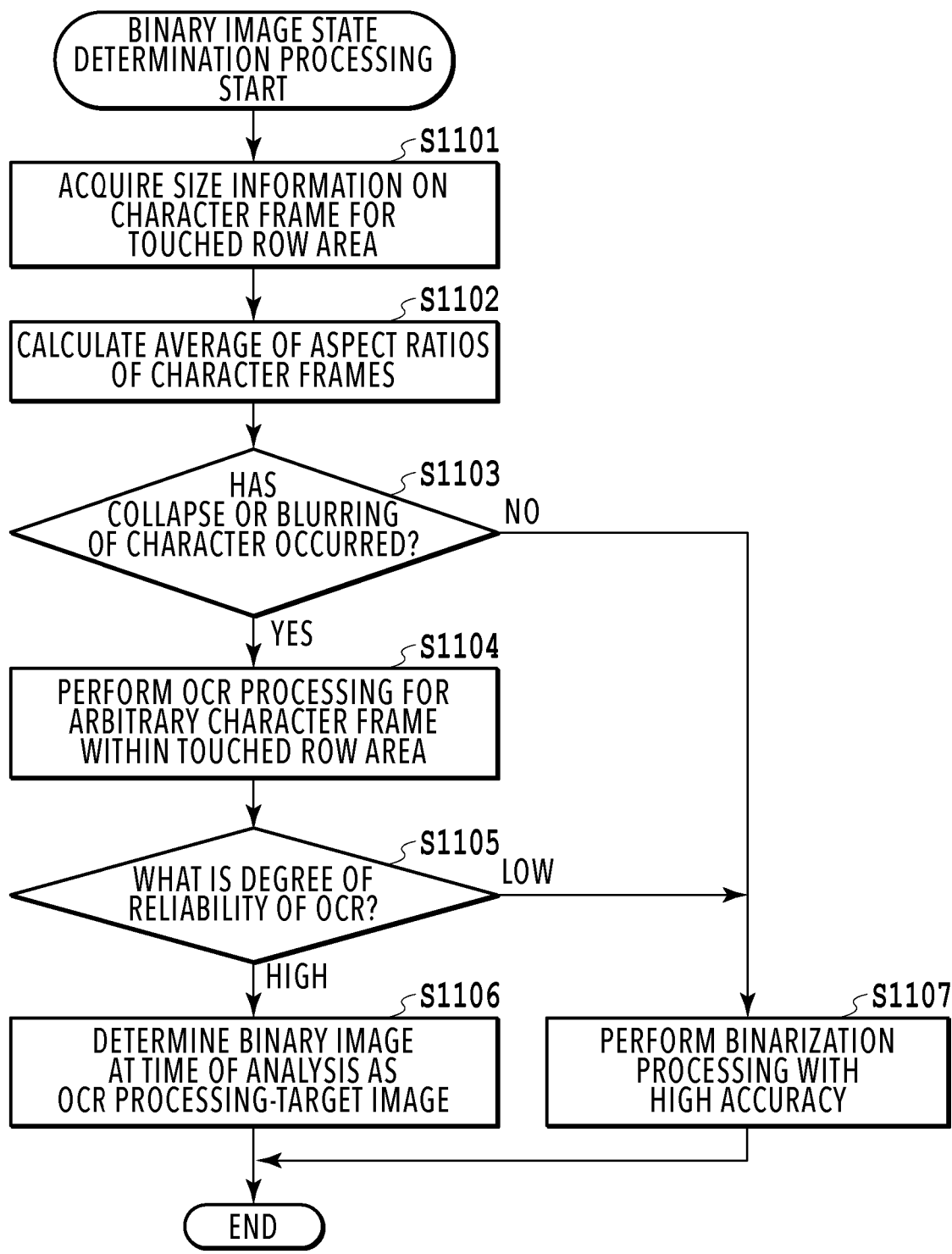
FIG. 11 is a flowchart showing details of binary image state determination processing.

At step 1005, by the image analysis unit 425, processing to determine whether the binary image of the row area for which the touch operation has been performed is in an image state suitable to the OCR processing and in the case where the binary image is not in an image state suitable to the OCR processing, to generate a new binary image (binary image state determination processing) is performed. As described previously, the binarization in the image analysis processing at step 505 is high-speed binarization that gives priority to the processing speed at the level capable of area division, and therefore, there is a case where a binary image suitable to the OCR processing, to be performed later, is not obtained. Consequently, prior to the OCR processing, the state of the binary image in the row area for which a user has performed the touch operation is determined and as occasion arises, the binarization that gives priority to accuracy is performed and a binary image suitable to the OCR processing is generated. FIG. 11 is a flowchart showing details of the binary image state determination processing. In the following, explanation is given along the flow in FIG. 11.

At step 1101, based on the above-described row area information, information on the size (width and height) of the character frame within the row area for which the touch operation has been performed is acquired. In the present embodiment, in addition to the information on the size of the character frame of the row area itself for which the touch operation has been performed, information on the size of the character frame within another row area (row area for which the touch operation has not been performed) located within the block area to which the row area belongs is also acquired. The reason is that the East Asian Language, such as Japanese, includes many characters made up of a plurality of parts and it is made possible to deal with the language such as this. For example, in the case where a character made up of two parts is divided simply by the valley portion of the projection histogram, the character is divided into two vertically elongated parts. Consequently, by using the information on the size of all the character frames included in the block area to which the row area according to the user selection belongs, the population of the calculation-target character frame is increased and a more accurate character width is estimated. In the case of the language, such as English, it is sufficient to acquire only the information on the size of the character frames existing within the row area according to the user selection.

At step 1102, by using the acquired information on the size of all the character frames, an average value of the aspect ratios in all the character frames is calculated. Here, the reason the aspect ratio of the character frame is found is explained. First, in the case where the character frame is vertically elongated, there is a possibility that the width is reduced by blurring of the character. On the other hand, in the case where the character frame is horizontally elongated, there is a possibility that the space between characters is reduced by collapse of the characters. Consequently, by finding the aspect ratio of the character frame for the row area for which the touch operation has been performed and in the case where the aspect ratio is not 1:1, it is possible to determine that the state of the binary image is in the state not suitable to the OCR processing. At this step, the information on the size of the character frame already obtained by the area division processing is used, and therefore, it is not necessary to perform a new analysis and high-speed determination is enabled.

At step 1103, based on the average value of the aspect ratios of the character frames found at step 1102, whether collapse or blurring has occurred in the read character (whether the possibility of collapse or blurring is strong) is determined. As described above, in the case where the character is blurred and the character frame is divided excessively, the aspect ratio of the character frame will indicate a vertically elongated shape. On the other hand, in the case where the character is collapsed, the space between characters is lost and the characters become close to each other, and therefore, the aspect ratio of the character frame will indicate a vertically elongated shape. By making use of this characteristic, whether or not collapse or blurring of a character has occurred is determined. In detail, the average value of the aspect ratios of the character frames of main fonts is stored in advance and determination is performed by determining whether the aspect ratio is close to the average value (for example, the difference is within 15%). In the case where it is determined that collapse or blurring has not occurred in the character (the possibility thereof is faint), the processing advances to step 1107. On the other hand, in the case where it is determined that collapse or blurring has occurred in the character (the possibility thereof is strong), the processing advances to step 1104.

At step 1104, the OCR processing is performed for an arbitrary character frame within the row area for which the touch operation has been performed. This processing takes into consideration a case where inside of a character has collapsed, although characters are not close to each other. Consequently, even in the case where the determination based on the aspect ratio of the character frame indicates no problem, the OCR processing is performed for an arbitrary character frame within the row area for which the touch operation has been performed and the state of a binary image is determined based on the reliability of the character recognition results. The number of arbitrary character frames may be small (one to several character frames).

At step 1105, whether the reliability of the character recognition results obtained by the OCR processing at step 1104 is high is determined. In the OCR processing, by using dictionary data in which the feature amounts (patterns) are registered in advance for a variety of characters, the specific character is recognized by finding the character whose feature amount matches with that of the input character from the dictionary data. Consequently, the higher the ratio of matching between feature amounts, the more correct the recognition results are (the stronger the possibility that the specified character is correct is). Then, in the case where there is more blurring or collapse in the character, there is a tendency for the matching rate to decrease. Consequently, by taking the matching rate of the feature amounts in the character recognition results as the reliability and it is determined that the binary image is a binary image not suitable to the OCR processing in the case where the reliability is low and it is determined that the binary image is a binary image suitable to the OCR processing in the case where the reliability is high. The reliability depends on an OCR engine that is used. Because of this, the value of reliability (for example, a predetermined threshold value, such as 95% or higher), which is a reference found experimentally from the OCR engine that is used, is stored in advance and by processing to compare the reliability of the character recognition results obtained at step 1104 with the threshold value, whether the reliability is high is determined. In the case where the reliability of the character recognition results is higher than or equal to the threshold value, the processing advances to step 1106 and in the case where the reliability is lower than the threshold value, the processing advances to step 1107.

At step 1106, it is determined that the binary image generated at the time of the image analysis at step 505 (generated prior to area division processing) is used also in the OCR processing as it is. On the other hand, at step 1107, by using the binarization method that gives priority to accuracy over processing speed, a binary image suitable to the OCR processing is generated. The binary image thus generated newly is used in the next OCR processing in place of the binary image at the time of image analysis. Here, as the binarization method that gives priority to accuracy, there is an adaptive binarization method of generating a binary image by changing the threshold value locally (in units of blocks of 8×8 pixels and the like), which is a method that uses a plurality of threshold values, or a method of extracting a portion (edge) where the gradient of density is great. The target range at this time may be only the row area for which a user has performed the touch operation. By limiting the target range of the binarization processing to the row area, it is possible to reduce the amount of memory used and to increase the processing speed. In the case where the binarization method that gives priority to accuracy is applied, it may also be possible to adaptively perform binarization by taking the range including the row area selected by a user and a predetermined peripheral range of the row area as the processing target. By doing so, it is made possible to determine a binarization threshold value while referring also to the information on the image around the row area.

The above is the contents of the binary image state determination processing. Explanation is returned to the flow in FIG. 10.

Figure 12:
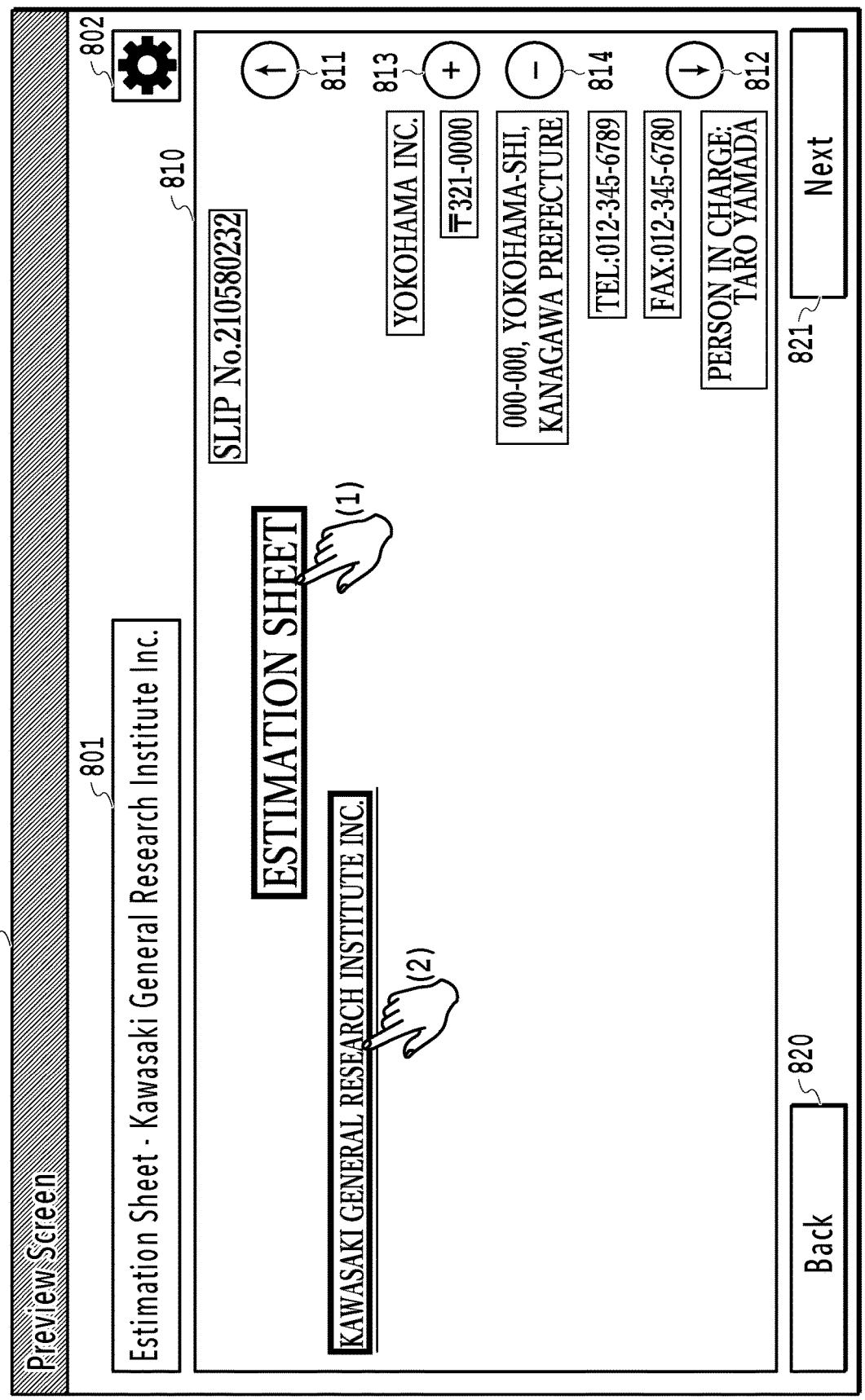
FIG. 12 is a diagram explaining the way a file name is set by using OCR processing results.

At step 1006, the OCR processing is performed for the binary image (binary image determined at step 1106 or binary image generated again at step 1107) of the row area for which the touch operation has been performed and the character string within the row area is extracted. Then, at step 1007, first, the character string of the file name being currently displayed in the file name input box 801 is acquired and after a delimiter (for example, hyphen "–") is attached to the character string, the character string extracted at step 1006 is added to the end thereof. In the case where the file name input box 801 is empty (no character string is input), no delimiter is attached and the extracted character string is added as it is. In this manner, the obtained character string is displayed (automatically input) in the file name input box 801 at step 1008 that follows. A specific example is shown in FIG. 12. Here, it is assumed that the touch operation is performed for the row areas in the order shown schematically in the preview area 810. In this case, in the file name input box 801, a character string of "Estimation sheet—Kawasaki General Research Institute Inc." is displayed. It may also be possible to change the display aspect of the row area for which the touch operation has been performed in the preview area 810 (for example, to hatch the row area, to change the color of the row area, and so on) in accordance therewith.

The above is the contents of the file name generation processing according to the present embodiment.

Modification Example

In the embodiment described above, the state determination to determine whether the binary image generated for area division is suitable to the OCR processing is performed and only in the case where the state of the binary image is not suitable to the OCR processing, the binarization processing is performed again for the row area according to user selection. It may also be possible to uniformly perform highly accurate binarization processing for the row area according to user selection without performing the state determination of the binary image such as this. In this case, it is no longer necessary to take into consideration the influence on the OCR processing that follows, and therefore, it is made possible to adopt a simpler and higher-speed method in the binarization processing for area division.

According to the present embodiment, in the analysis (area division) stage of a scanned image, a binary image is generated by a binarization method that gives priority to processing speed. On the other hand, in the stage of OCR processing, a binary image suitable to OCR processing is generated by using a binarization method that gives priority to accuracy for the row area selected by a user. Due to this, it is made possible both to increase the speed of a preview display and to improve the character recognition accuracy in OCR processing at the time of acquiring character information from a scanned image.

Second Embodiment

Next, an aspect is explained as a second embodiment, in which OCR processing is performed sequentially for row areas within an image. Explanation of the contents in common to those of the first embodiment is omitted and in the following, file name generation processing, which is a different point, is explained mainly.

Figure 13:
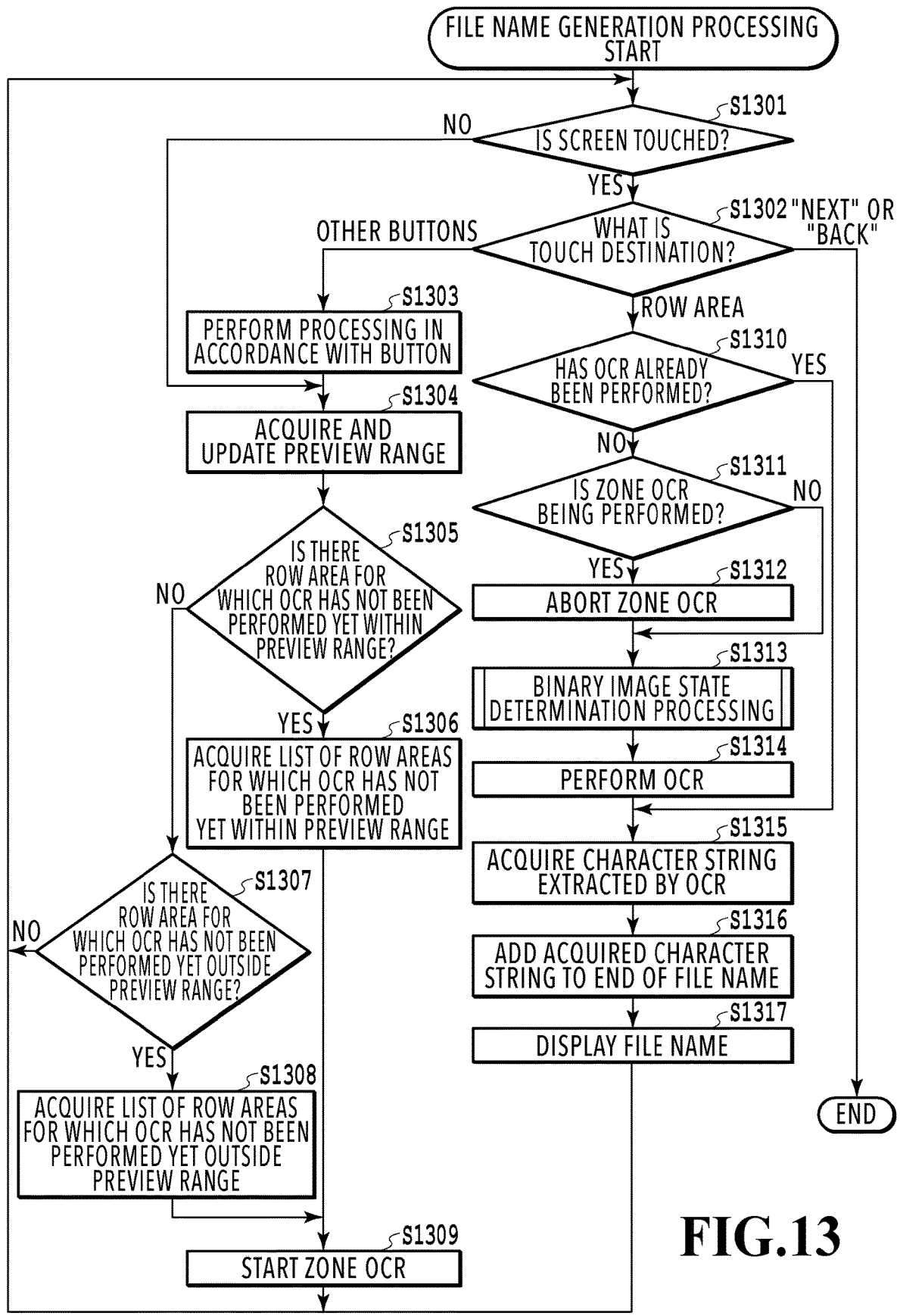
FIG. 13 is a flowchart showing details of file name generation processing according to a second embodiment.

FIG. 13 is a flowchart showing details of the file name generation processing (step 507) in the preview display unit 426 according to the present embodiment. In the following, detailed explanation is given along the flow in FIG. 13.

At step 1301, whether or not there is a touch operation by a user to Preview screen 800 displayed on the touch panel is monitored. In the case where the touch operation is detected, the processing advances to step 1302. On the other hand, in the case where no touch operation is detected, the processing advances to step 1304.

At step 1302, the processing is branched according to touch destination. In the case where the touch destination is the "Next" button 821 or the "Back" button 820, this processing is terminated. In the case where the touch destination is one of the row areas being displayed within the preview area 810, the processing advances to step 130. In the case where the touch destination is the other buttons, the processing advances to step 1303.

At step 1303, processing in accordance with the button of the touch destination is performed. For example, in the case where the touch destination is the "↓" button 812, the display area is scrolled in the downward direction and in the case of the "–" button 814, the display area is caused to zoom out. Each piece of processing at step 1304 to step 1309 that follow is performed in the image analysis unit 425 based on instructions from the preview display unit 426.

At step 1304, information on the display area in the range (current preview range) of the current preview area 810 is acquired and updated as needed. That is, in the case where the simultaneous execution of OCR processing has been started at step 1309, to be described later, the display aspect is changed so that it is possible to distinguish the row area for which the OCR processing has already been performed at the current point in time from the row area for which the OCR processing has not been performed yet by displaying the row area for which the OCR processing has already bee performed in a highlighted state (the row area is hatched, the frame or the color of the row area is changed, and so on). Further, in the case where processing, such as scrolling, enlargement, and reduction, of the display area has been performed at step 1303, the display aspect of the row area is changed based on the display area within the current preview range after the processing. In the case where a user has not performed any operation, information on the display area (for example, in the case of a scanned image of a document of A4 portrait, which is written from left to right, the scanned image is displayed so that the top end of the scanned image is aligned with the top end of the display area and the entire width of the scanned image in the direction of width is just included within the display area) in accordance with the initial settings described previously is acquired as information on the current preview range.

At step 1305, whether a row area for which the OCR processing has not been performed yet exists within the current preview range is determined. In the case where a row area for which the OCR processing has not been performed yet exists inside the current preview range, the processing advances to step 1306 and information on the row area for which the OCR processing has not been performed yet (hereinafter, also called "OCR-not-performed-yet list") of the row areas existing within the current preview range is acquired. At this time, the row area that stretches over the inside and the outside (boundary) of the current preview range is also the target in the case where the OCR processing has not been performed yet for the row area. Further, it may also be possible to cause the current preview range to have a margin to predetermined extent. That is, it is possible to handle a peripheral range including the current preview range as a "current preview range". Due to this, even in the case where a user scrolls the preview display area to certain extent, the OCR processing has already been performed for the row area existing on the periphery of the current preview range, and therefore, the character string is quickly reflected in the file name input box 801. As described above, a method of causing the current preview range to have a margin is effective in the case where, for example, an enlarged preview is displayed or the touch panel itself is small. In the case where the results of the determination indicate that a row area for which the OCR processing has not been performed yet does not exist within the current preview range, the processing advances to step 1307.

At step 1307, whether a row area for which the OCR processing has not been performed yet exists outside the current preview range is determined. In the case where a row area for which the OCR processing has not been performed yet exists outside the current preview range, the processing advances to step 1308 and information on the row area for which the OCR processing has not been performed yet (OCR-not-performed-yet list) of the row areas existing outside the current preview range is acquired. On the other hand, in the case where a row area for which the OCR processing has not been performed yet does not exist, the processing returns to step 1301.

Figure 14:
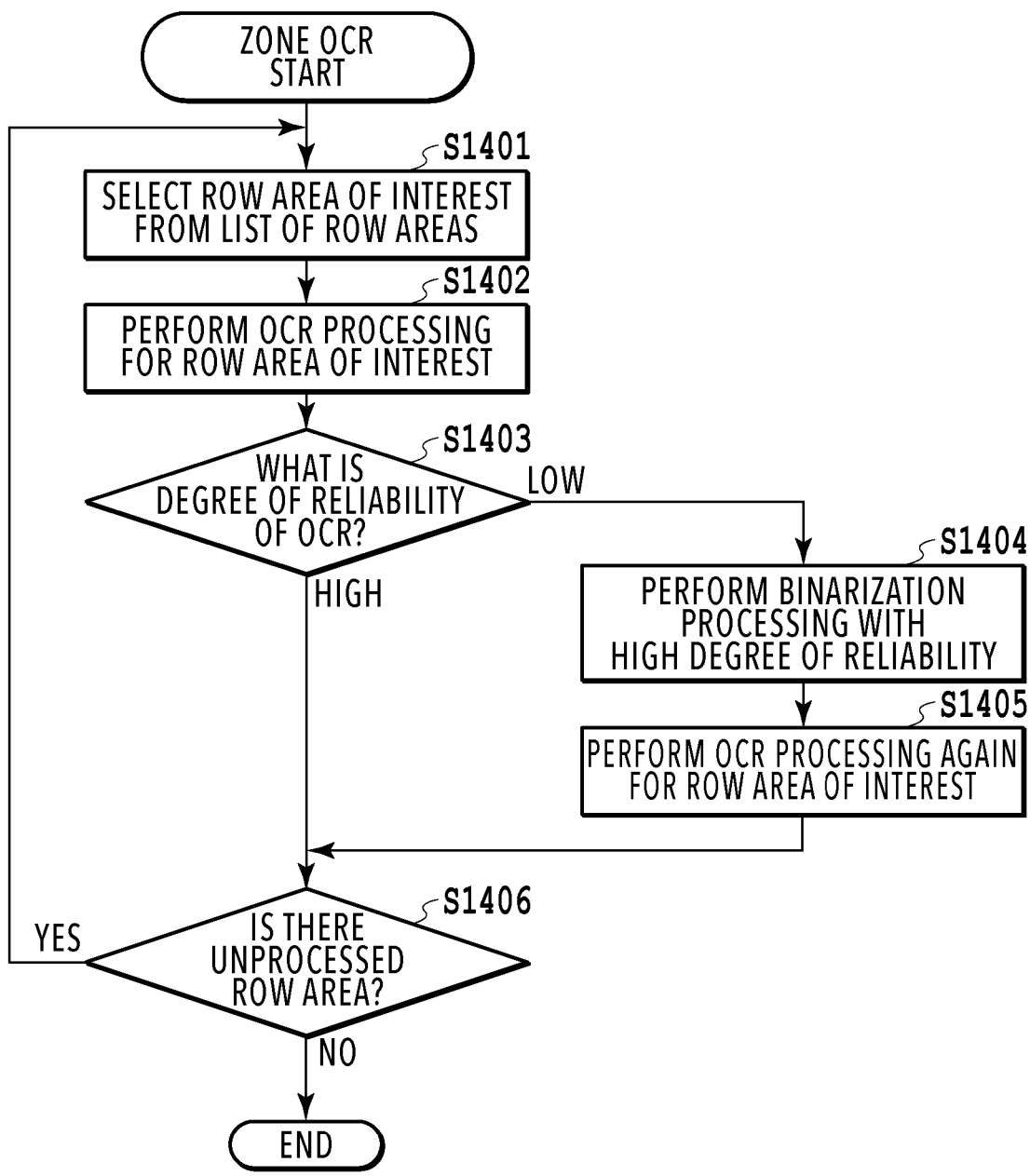
FIG. 14 is a flowchart showing details of zone OCR.

At step 1309, simultaneous execution of OCR processing (hereinafter, called "zone OCR") is started for a predetermined row area in the OCR-not-performed-yet list acquired at step 1306 or step 1308. Here, the predetermined row area is determined in accordance with a condition determined in advance with, for example, the position coordinates or size of the row area being taken as a reference. As the condition based on the position coordinates of a row area, a condition is considered that the highest priority is given to a row area whose y-coordinate is small, the second highest priority is given to a row area whose x-coordinate is small, and the three row areas with the highest priority, the second highest priority, and the third highest priority are taken to be the target of the zone OCR. Further, as the condition based on the size of a row area, a condition is considered that higher priority is given to a row area whose size is larger and the three row areas with the highest priority, the second highest priority, and the third highest priority are taken to be the target of the zone OCR. As illustrated here, the condition for determining the target of the zone OCR is determined by a user or an administrator taking into consideration the arithmetic operation resource and the like. The zone OCR is processed in the background and the processing returns to step 1301 at the same time as the start of execution of the zone OCR. FIG. 14 is a flowchart showing details of the zone OCR. In the following, along the flow in FIG. 14, the zone OCR is explained.

At step 1401, one row area on which attention is focused (hereinafter, "row area of interest") is selected from the OCR-not-performed-yet list. At step 1402 that follows, the OCR processing is performed for the row area of interest. Then, at step 1403, as in the case with step 1105 of the flow in FIG. 11 in the first embodiment, whether the degree of reliability of the character recognition results obtained by the OCR processing is high is determined. In the case where the reliability of the character recognition results is high (higher than or equal to a threshold value), the processing advances to step 1406 and in the case where the reliability is low (less than a threshold value), the processing advances to step 1404. At step 1404, as in the case with step 1107 of the flow in FIG. 11 in the first embodiment, a binary image suitable to OCR processing is generated by using a binarization method that gives priority to accuracy. Then, at step 1405 that follows, the OCR processing is performed again for the row area of interest by using the binary image generated at step 1404. At step 1406, whether there is an unprocessed row area in the OCR-not-performed-yet list is determined. In the case where there is an unprocessed row area, the processing returns to step 1401, and the next row area of interest is selected and the processing is continued. On the other hand, in the case where all the row areas in the OCR-not-performed-yet list have been processed, this processing is terminated. The above is the contents of the zone OCR. Explanation is returned to the flow in FIG. 13.

At step 1310 in the case where the touch operation to any row area being displayed within the preview area 810 has been detected, whether the OCR processing for the row area according to the touch operation has already been performed is determined. In the case where the results of the determination indicate that the OCR processing has already been performed, the processing advances to step 1315. On the other hand, in the case where the OCR processing has not been performed yet, the processing advances to step 1311.

At step 1311, whether the above-described zone OCR is being performed is determined. In the case where the zone OCR is being performed, the execution of the zone OCR is aborted at step 1312. On the other hand, in the case where the zone OCR is not being performed, the processing advances to step 1313 and the binary image state determination processing described previously (see the flow in FIG. 11 described previously) is performed. That is, whether the binary image of the row area for which the touch operation has been performed is in the image state suitable to the OCR processing is determined, and in accordance with necessity, the binarization processing that gives priority to accuracy is performed and a binary image suitable to the OCR processing is generated. Then, at step 1314, for the row area for which the touch operation has been performed, the OCR processing is performed by using the binary image generated by the binarization method whose accuracy is high in accordance with necessity.

At step 1315, the character string extracted at step 1314 or the character string already extracted by the zone OCR for the row area for which the touch operation has been performed is acquired. Then, at step 1316, the file name being currently displayed in the file name input box 801 is acquired and the character string acquired at step 1305 is added thereto, and the file name to which the character string is added is newly set as the component of the file name. Then, at step 1317, the character string being set at the current point in time is displayed (automatically input) in the file name input box 801.

The above is the contents of the file name generation processing according to the present embodiment.

According to the present embodiment, at the point in time at which a user touches a desired row area, it is possible to quickly display a recognized character string that is already extracted provided that the OCR processing for the row area has already been performed. Due to this, it is made possible to quickly perform the setting of a file name and the like efficiently.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible both to increase the speed of a preview display and to improve the accuracy of OCR processing at the time of acquiring character information from a scanned image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181698, filed Sep. 21, 2017 which is hereby incorporated by reference wherein in its entirety.

What is claimed is:

1. An image processing apparatus that acquires character information from a scanned image, the image processing apparatus comprising:
    a memory that stores a program; and
    at least one processor that executes the program to perform:
        obtaining a first binary image by binarizing the scanned image with a first binarization method;
        extracting a text area by performing area division processing for the first binary image;
        determining, based on aspect ratios of circumscribing rectangles corresponding to clusters of black pixels included in the text area, whether the first binary image is suitable to OCR processing;
        performing the OCR processing by using the first binary image in a case where it is determined that the first binary image is suitable to the OCR processing;
        obtaining a second binary image by binarizing the scanned image with a second binarization method in a case where it is determined that the first binary image is not suitable to the OCR processing; and
        performing the OCR processing by using the second binary image in a case where it is determined that the first binary image is not suitable to the OCR processing.

2. The image processing apparatus according to claim 1, wherein
    the text area is a row area of a character string selected by a user.

3. The image processing apparatus according to claim 1, wherein
    the determination of whether the first binary image is suitable to the OCR processing is performed based on an average value of the aspect ratios of the circumscribing rectangles corresponding to the clusters of black pixels included in the text area.

4. The image processing apparatus according to claim 3, wherein the text area is a row area of a character string selected by a user, and
    wherein the determination of whether the first binary image is suitable to the OCR processing is performed by comparing an average value of aspect ratios of circumscribing rectangles corresponding to clusters of black pixels included in the row area and an average value of aspect ratios corresponding to a predetermined font stored in advance.

5. The image processing apparatus according to claim 3, wherein
    the determination of whether the first binary image is suitable to the OCR processing based on the average value of the aspect ratios of the circumscribing rectangles corresponding to the clusters of black pixels included in the text area and a reliability of character recognition results obtained by performing a OCR processing for a part of the clusters of black pixels included in the text area.

6. The image processing apparatus according to claim 5, wherein
    the determination of whether the first binary image is suitable to the OCR processing is performed by first comparison processing between the average value of the aspect ratios of the circumscribing rectangles corresponding to the clusters of black pixels included in the text area and an average value of aspect ratios corresponding to a predetermined font, and by second comparison processing between the reliability of the obtained character recognition results and a predetermined threshold value.

7. The image processing apparatus according to claim 6, wherein
the reliability is a matching rate of feature amounts in the character recognition results.

8. The image processing apparatus according to claim 1, wherein
the first binarization method is a binarization method whose processing speed is higher than that of the second binarization method.

9. The image processing apparatus according to claim 1, wherein
the first binarization method is a binarization method that uses a single threshold value, and
the second binarization method is a binarization method that uses a plurality of threshold values.

10. The image processing apparatus according to claim 1, further comprising:
a user interface that receives a selection of a row area of a character string from text areas extracted by performing the area division processing for the first binary image, wherein
the determination of whether the first binary image is suitable to the OCR processing is performed based on aspect ratios of circumscribing rectangles corresponding to clusters of black pixels included in a row area selected by a user via the user interface, and wherein
the second binary image is obtained by binarizing an area corresponding to the selected row area in the scanned image with the second binarization method in a case where it is determined that the first binary image is not suitable to the OCR processing.

11. A method of image processing to acquire character information from a scanned image, the method comprising the steps of:
obtaining a first binary image by binarizing the scanned image with a first binarization method;
extracting a text area by performing area division processing for the first binary image;
determining, based on aspect ratios of circumscribing rectangles corresponding to clusters of black pixels included in the text area, whether the first binary image is suitable to OCR processing;
performing the OCR processing by using the first binary image in a case where it is determined that the first binary image is suitable to the OCR processing;
obtaining a second binary image by binarizing the scanned image with a second binarization method in a case where it is determined that the first binary image is not suitable to the OCR processing; and
performing the OCR processing by using the second binary image in a case where it is determined that the first binary image is not suitable to the OCR processing.

12. A non-transitory computer readable storage medium storing a program for causing a computer to perform:
obtaining a first binary image by binarizing a scanned image with a first binarization method;
extracting a text area by performing area division processing for the first binary image;
determining, based on aspect ratios of circumscribing rectangles corresponding to clusters of black pixels included in the text area, whether the first binary image is suitable to OCR processing;
performing the OCR processing by using the first binary image in a case where it is determined that the first binary image is suitable to the OCR processing;
obtaining a second binary image by binarizing the scanned image with a second binarization method in a case where it is determined that the first binary image is not suitable to the OCR processing; and
performing the OCR processing by using the second binary image in a case where it is determined that the first binary image is not suitable to the OCR processing.

\* \* \* \* \*